Aug. 15, 1967    W. RAUSCH ET AL    3,336,203
CORE VESSEL OF A PEBBLE-BED NUCLEAR REACTOR
Filed Sept. 7, 1965    3 Sheets-Sheet 1

Wilfried Rausch
Claus-Benedikt Von Der Decken
Bernhard Hühndorf-Richter

Inventors:

By: Spencer & Kaye
Attorneys

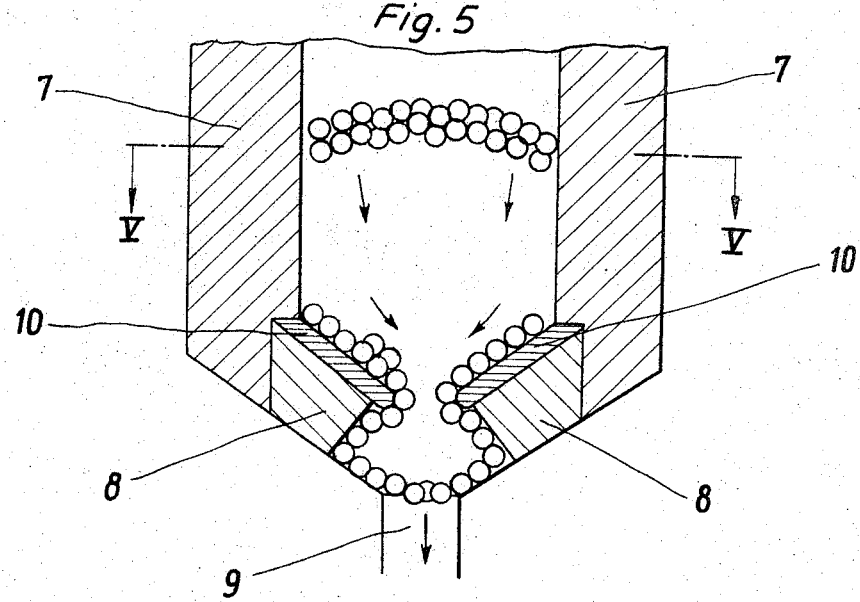
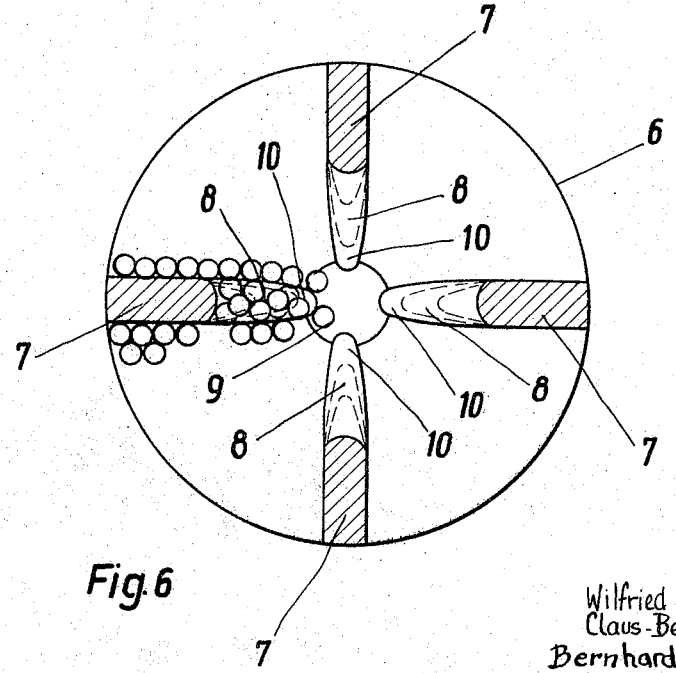

United States Patent Office 3,336,203
Patented Aug. 15, 1967

3,336,203
CORE VESSEL OF A PEBBLE-BED NUCLEAR REACTOR
Wilfried Rausch, Strass, near Geyer, Duren, and Claus-Benedikt von der Decken and Bernhard Hühndorf-Richter, Aachen, Germany, assignors to Brown Boveri/Krupp, Reactorbau G.m.b.H., Dusseldorf, Germany
Filed Sept. 7, 1965, Ser. No. 485,330
Claims priority, application Germany, Sept. 12, 1964, B 78,521
11 Claims. (Cl. 176—40)

The present invention relates to a pebble-bed nuclear reactor, and particularly to the core vessel of such a reactor for use with spherical fuel elements.

The present invention is particularly concerned with the construction of a novel type of reactor core vessel whose inside wall is constituted by a predominantly cylindrical upper portion having a cylindrical axis which is parallel to the direction of movement induced in the fuel elements by a circulating device associated with the reactor, the vessel also having a lower frusto-conical wall portion connected to a fuel extraction duct which is coaxial with the cylindrical wall portion.

In nuclear reactors where the fuel introduced into the core is in the form of pebbles having a spherical or similar regular configuration, it is important that the rate of movement of the fuel elements be as uniform as possible over the entire transverse cross-section, including the peripheral zones, of the core in order to permit an even burning of the fuel elements. It has been found, however, that in nuclear reactors of the prior art type having a cylindrical core vessel, as well as in reactors having ribs for receiving shut-down rods disposed on the inside wall of the vessel, the fuel elements in the peripheral zones of the core are subjected to a substantial braking force. For example, in a core capable of receiving a charge of approximately 84,000 fuel elements, about 1,200,000 fuel elements must be circulated through the core vessel before a fuel element which has been introduced in the peripheral region of the vessel at a point about midway between two adjacent ribs passes completely through the core vessel. As a result, when statistically distributed blind fuel elements or test elements have to be removed from the core, or when the core configuration has to be changed by the addition of fuel elements in a carefully controlled manner, an undesirably long period of time is required even when the circulating device is working at top speed.

Experiments with prior art pebble-bed reactors have revealed that the braking of the movement of fuel elements disposed near the periphery of the core vessel is caused mainly by the building up of a regular configuration of fuel elements in this peripheral region during the operation of the reactor. In other words, the marginal zone of the pebble bed, which correspond with the zone located in the peripheral region of the core vessel, eventually acquires a completely regular configuration which extends into the core to a depth of about four or five layers of fuel elements. This regular configuration extends completely around the circumference of the cylindrical vessel. It has been found that voids may form in this regular configuration, but these voids behave exactly like fuel elements during the circulation of the pebble bed. The structure of the pebble bed disintegrates when it passes into the conical portion of the core vessel while moving towards the fuel extraction duct. The formation of a regular configuration of fuel elements in the boundary zone of the cylindrical portion of the pebble bed could be ascribed to the tendency of the pebble-bed system to enter into a state of minimum potential energy in this marginal, or boundary, zone. This only occurs under dynamic conditions, i.e., during circulation of the fuel elements, because it is only under these conditions that the pebble bed is being continually supplied with energy to overcome friction. The braking of the pebbles in the boundary regions is a direct result of the regular configuration which develops after the reactor has been in operation for some time. It has been found that the rate of travel of the fuel elements in the marginal region is reduced by a factor of more than 2. One such prior art core vessel is represented by the core vessel 5 of the British Patent No. 822,461, complete specification published on Oct. 28, 1959.

These experiments have also revealed that conditions are even worse in nuclear reactor core vessels containing ribs for receiving shut-down rods. In these devices, the spherical fuel elements in the marginal regions are slowed down by a factor of three or more, and a separate fuel element structure forms in each portion of the boundary region separated by an adjacent pair of ribs. Since the fuel generally travels at a different speed in each of these portions of the boundary region, an asymmetrical core structure results.

It is a primary object of the present invention to eliminate these drawbacks.

It is a more specific object of this invention to create a uniform rate of movement of the fuel elements across the entire transverse cross section of the core vessel.

It is another object of the present invention to increase the speed of the fuel elements disposed near the periphery of the core vessel.

The present invention eliminates these variations in the rate of movement of the fuel elements across the transverse cross-section of the core vessel by shaping the inside wall of the vessel in such a way as to prevent the creation of a regular configuration of the fuel elements in the peripheral regions of the vessel.

This is achieved, in a pebble-bed nuclear reactor having a bed of regularly shaped, and preferably spherical, fuel elements and a circulating device for circulating the elements, by the provision of an arrangement which comprises a reactor core vessel having a substantially cylindrical upper inside wall portion, the cylindrical axis of which is parallel to the direction in which the circulating device moves the fuel elements, the inside wall portion having a plurality of axially displaced rows of guide surfaces disposed thereon, each of the rows being constituted by a plurality of the guide surfaces equispaced around the periphery of the wall portions, and each of the guide surfaces lying at an acute angle with respect to the cylindrical axis.

In a preferred embodiment of the present invention, the guide surfaces of one of the rows are peripherally offset from the guide surfaces in an adjacent one of the rows, so that each of the guide surfaces is disposed in the axial projection of the gap between two adjacent guide surfaces of the following row. However, such staggering is not vital to the practice of the present invention.

Each of the guide surfaces is preferably arranged to lie at an angle of less than 20° with respect to the cylindrical axis.

Core vessels according to the present invention can be employed in any type of pebble-bed nuclear reactor utilizing regularly shaped fuel elements. The reactors in which the core vessels of the present invention can be used may be of the type in which a gas coolant flows through the vessel together with the fuel elements, as is the case for the reactor shown in the above-cited British patent, or of the type in which a liquid coolant or moderator flows through the core vessel together wtih the fuel elements. The improved results of the present invention are realized regardless of whether a gas or liquid medium is present in the core vessel.

Additional objects and advantages of the present invention will become apparent upon consideration of the following description when taken in conjunction with the accompanying drawings in which:

FIGURE 5 is a partial, longitudinal, cross-sectional view showing the lower portion of a reactor core illustrating another feature of the present invention.

FIGURE 6 is a cross-sectional view, taken along the plane V—V of FIGURE 5.

Figure 1:
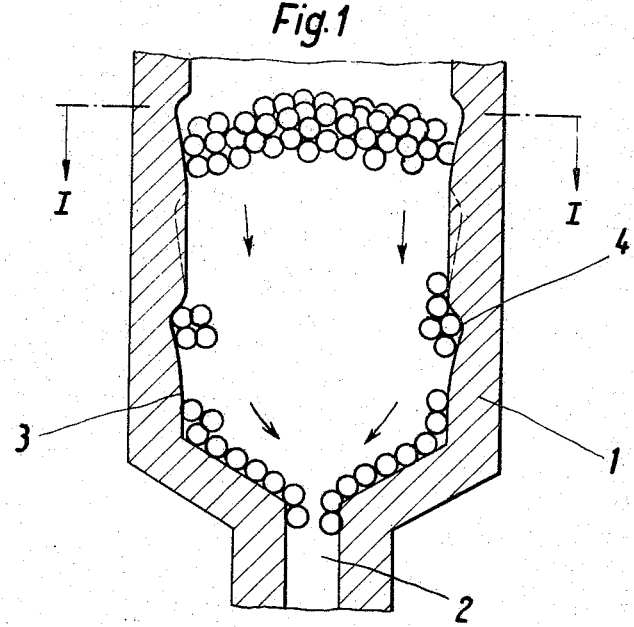
FIGURE 1 is a longitudinal, cross-sectional view of a reactor core according to the present invention.
Figure 2:
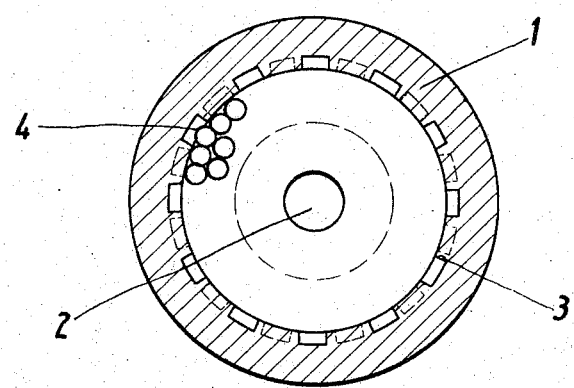
FIGURE 2 is a cross-sectional view taken along the plane I—I of FIGURE 1.

FIGURES 1 and 2 show a reactor core vessel 1 constructed to include a first preferred embodiment of the present invention and filled with a mass of spherical fuel elements, only some of which are shown for purposes of clarity. The various portions of this unit have not been drawn to scale in order to more clearly illustrate the principles of the present invention. Specifically, variations in the surface of the inside wall of the vessel have been exaggerated in order to facilitate an understanding of the invention. Vessel 1 is shown to comprise a substantially cylindrical upper portion and a frusto-conical lower portion in the vicinity of a fuel extraction duct 2 which is coaxially disposed with respect to the cylindrical portion. The inside wall 3 of the vessel contains a number of slot-like recesses 4 which are oriented substantially in the direction of the cylindrical axis of the upper portion. These recesses 4 are arranged in a number of rows which are displaced axially along the upper portion. Each row includes a plurality of recesses which are equispaced around the periphery of the inside wall. Each row of recesses is staggered so as to cause each of the recesses to be positioned midway between two successive recesses of the adjacent row. It would also be possible to arrange the recesses so that the recesses of one row are staggered to a different degree, or are not staggered at all, with respect to the recesses of the adjacent rows. The recesses 4 form guide surfaces which taper inwardly, towards the axis of the cylindrical upper portion, in the direction of movement of the fuel elements, the direction of movement of the fuel elements being indicated by the arrows in FIGURE 1, creating a pebble-bed boundary surface having a quasi-conical configuration. This arrangement permits the destruction of the regular structure which the fuel elements tend to form in the peripheral regions of the core vessel during the operation of the reactor. When spherical fuel elements are used, the maximum depth of the recesses 4 may be equal to the radius of an element while the length of the recesses is equal to 6 to 8 times the diameter of an element. The width of the recesses 4, taken along the periphery of the inside wall of the cylindrical upper portion of vessel 1, is made large enough to receive one or two of the fuel elements. Finally, the lateral edges of the recesses 4 are bevelled or rounded off (not visible in the drawing).

Figure 3:
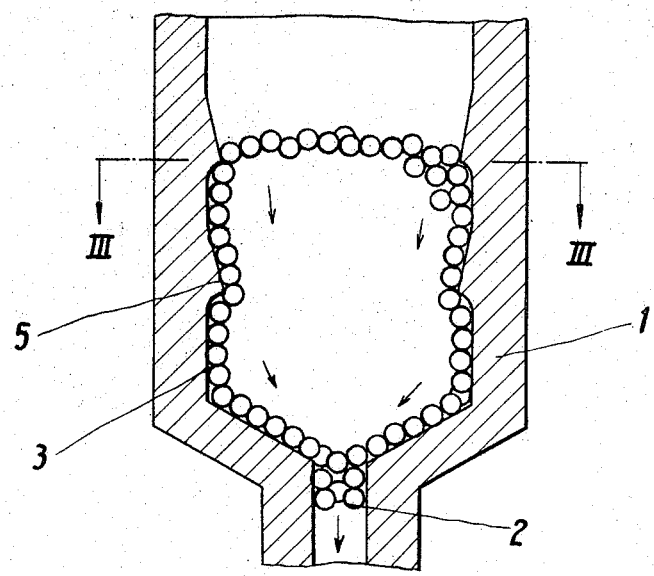
FIGURE 3 is a longitudinal, cross-sectional view of a reactor core constituting a second embodiment of the present invention.
Figure 4:
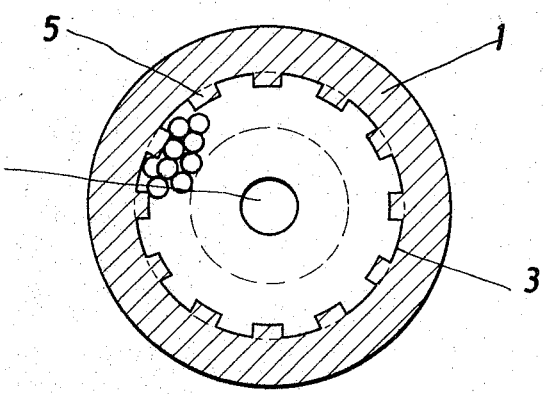
FIGURE 4 is a longitudinal, cross-sectional view taken along the plane III—III of FIGURE 3.

Turning now to FIGURES 3 and 4, there is shown another embodiment of the present invention in a reactor core vessel 1 which also has a conical floor and an axially aligned fuel extraction duct 2. The cylindrical inside wall 3 of this core vessel has a number of guide members 5 projecting from its surface, starting from smooth transition portions, and defining guide surfaces lying at an acute angle of about 10° with respect to the axis of the cylindrical portion. The dimensions of thees guide members are the same as those of the recesses 4 of FIGURES 1 and 2. The guide members of each row may be aligned with those of the remaining rows or may be staggered, as described in connection with FIGURES 1 and 2. Vessel 1 is shown to be filled with spherical fuel elements whose direction of movement is indicated by the arrows.

Turning now to FIGURES 5 and 6, here is shown the bottom end of a reactor core vessel 6 constructed according to another feature of the present invention and also filled with a plurality of spherical fuel elements which move in the direction of the arrows. The inside of vessel 6 contains a plurality of symmetrically arranged, longitudinally disposed ribs 7 for receiving shut-down rods (not shown). In order to prevent the spherical fuel elements in the peripheral regions of the vessel from slowing down, the ribs 7 are provided with inwardly extending extensions 8 carrying slanting guide members 10 which project over the fuel extraction duct 9 and which overhang all of the exposed sides of extensions 8 in a roof-like manner. This structure serves to impede the downward movement of the fuel elements present in the central region of the vessel 6 while permitting the fuel elements adjacent the conical walls of the lower portion of the vessel to move freely since they are disposed below the guide members 10. Moreover, the presence of the members 10 acts to reduce the pressure which would normally be applied to the fuel elements in the lower conical portion by the upper portion of the pebble-bed if the guide members 10 were not present.

When the reactor core vessel is designed in the above-described manner, the rate of movement of the fuel elements traveling in the peripheral region of the vessel is increased, in comparison with the rate of movement thereof in the prior art devices, by a factor of more than two in the case of a reactor not having ribs projecting into the core region, and by a factor of three or more in the case of reactors equipped with such ribs. In reactors of the latter type, moreover, the structure of the present invention permits the speed distribution of the fuel elements to be substantially equal in every portion between adjacent ribs.

The guide surfaces are preferably flat but may also conveniently be made to be curved in certain cases, each guide surface being, for example, made in the form of a segment of a cone whose axis lies on the cylindrical axis of the upper wall portion. Preferably, the width of each guide surface, taken around the circumference of the inner wall of the core vessel, is at least equal to the largest dimension of each fuel element. For example, in the case where spherical fuel elements are used, the width would be at least equal to the diameter of each element. A width of this size ensures that fuel elements will be continually forced out of the structure being formed in the boundary region, thus preventing this structure from assuming a regular configuration.

The guide surfaces may conveniently be formed by guide members projecting from the inner wall surfaces or by recesses formed in the wall surface. The height of the projecting guide members, or depth of the recesses, is conveniently equal to approximately one-half of the largest dimension of the fuel elements, this being equal to the radius in the case of spherical elements. The lateral edges of the guide surfaces are preferably bevelled or rounded off in order to prevent fuel elements from being damaged when pressed thereagainst. The distance between two recesses or projecting guide members is preferably less than ten times the largest dimension of the fuel elements.

The guide surfaces may be distributed in a variety of ways over the inside wall and their precise dimensions are not critical.

The present invention also contemplates the placing of a plurality of guide members of a second type in a substantially radial manner in the region of frusto-conical lower wall portion and the centrally arranged fuel extraction duct disposed at the bottom of the core vessel, these guide members being inwardly-directed within said vessel and projecting over the fuel extraction duct. These guide members are further arranged to slant downwardly toward the cylindrical axis of the core vessel.

These guide members of a second type are provided to counteract the undesirable braking forces applied to the fuel elements in the part of the marginal core region near the frusto-conical lower wall portion of the vessel. The projecting portions of these second guide members serve to reduce the effective cross-section of the fuel extraction duct only for the central region of the core disposed above them, while the width of these second guide surfaces serves to impede the downward movement of the fuel elements in the central core region and to reduce the pressure which would otherwise be applied by the fuel elements in this central core region to the fuel elements flowing downwardly along the frusto-conical vessel wall portion. This pressure reduction also contributes to an increase in the rate of movement of the fuel elements flowing along this frusto-conical portion. These second guide members are also designed to have a ridge at their radially outermost ends which aids the downward flow of the fuel elements traveling in the peripheral zone of the lower cylindrical vessel portion.

These second guide members may also be used in nuclear reactors having axially disposed ribs on the inside of the vessel for receiving shut-down rods. In this case, it is convenient to provide the lower ends of the ribs with radial projections which support the second guide members in such a way that these guide members overhang all of the exposed sides of the projections. Experiments have shown that the rate of movement of spherical fuel elements in the marginal regions of vessels equipped with such core members is more than double that of similar elements in vessels not equipped with such guide members. These second guide members may preferably be shaped in such a way that the surface portions in contact with the fuel elements have approximately parabolic, symmetrical cross sections in planes perpendicular to the longitudinal axis of the core vessel.

It will be understood that the above description of the present invention is susceptible to various modifications, changes, and adaptations, and the same are intended to be comprehended within the meaning and range of equivalents of the appended claims.

What is claimed is:

1. In a pebble-bed nuclear reactor having a bed of regularly shaped fuel elements, the arrangement which comprises a reactor core vessel through which the fuel elements are to be circulated, said vessel having a substantially cylindrical upper inside wall portion, the cylindrical axis of which is parallel to the direction in which the fuel elements are to be circulated, said inside wall portion having a plurality of axially displaced rows of guide surfaces disposed thereon, each of said rows being constituted by a plurality of said guide surfaces equispaced around the periphery of said wall portion and each of said guide surfaces lying at an acute angle with respect to the cylindrical axis.

2. An arrangement as defined in claim 1 wherein the guide surfaces of one of said rows are peripherally offset from the guide surfaces in an adjacent one of said rows.

3. An arrangement as defined in claim 1 wherein each of said guide surfaces lies at an angle of less than 20° with respect to the cylindrical axis.

4. An arrangement as defined in claim 1 wherein the width of each of said guide surfaces, taken in the direction of the periphery of said wall portion, is at least equal to the largest dimension of each of the fuel elements.

5. An arrangement as defined in claim 1 wherein each of said guide surfaces is constituted by a guide member projecting from said inside wall portion.

6. An arrangement as defined in claim 1 wherein said guide surfaces are constituted by recesses formed in said inside wall portion.

7. An arrangement as defined in claim 1 wherein said guide surfaces have bevelled lateral edges.

8. An arrangement as defined in claim 1 wherein said guide surfaces have rounded lateral edges.

9. An arrangement as defined in claim 1 wherein said core vessel further has: a frusto-conical lower wall portion; and a fuel extraction duct which is connected to the inner edge of said lower wall portion, said duct being coaxial with said cylindrical wall portion, said arrangement further comprising a plurality of second, inwardly directed guide members disposed within said vessel and projecting over said fuel extraction duct.

10. An arrangement as defined in claim 9 wherein said second guide members slant downwardly toward the cylindrical axis.

11. An arrangement as defined in claim 9 further comprising: a plurality of symmetrically arranged, axially extending ribs for receiving shut-down rods, said ribs being disposed on said cylindrical wall portion and extending as far as said frusto-conical wall portion; and a plurality of radial extensions, each of which is connected to the lower end of a respective one of said ribs and each of which carries a respective one of said second guide members.

References Cited
UNITED STATES PATENTS

| | | | |
|---|---|---|---|
| 2,756,909 | 7/1956 | Hedu | 222—459 |
| 2,994,651 | 8/1961 | Spence | 176—46 X |
| 3,092,562 | 6/1963 | Van der Schee | 176—47 X |
| 3,136,700 | 6/1964 | Poppendiek et al. | 176—47 |
| 3,140,235 | 7/1964 | Hatch et al. | 176—40 X |
| 3,244,597 | 4/1966 | Tower | 176—40 |

FOREIGN PATENTS

| | | |
|---|---|---|
| 414,609 | 8/1934 | Great Britain. |
| 894,903 | 8/1962 | Great Britain. |

REUBEN EPSTEIN, *Primary Examiner.*